United States Patent
Michels et al.

(10) Patent No.: US 6,858,699 B2
(45) Date of Patent: Feb. 22, 2005

(54) POLYURETHANE ELASTOMERS AND PROCESSES FOR THEIR PREPARATION AND USE

(75) Inventors: Erhard Michels, Köln (DE); Hartmut Nefzger, Pulheim (DE); Stephan Schleiermacher, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/687,959

(22) Filed: Oct. 20, 2003

(65) Prior Publication Data

US 2004/0082677 A1 Apr. 29, 2004

(30) Foreign Application Priority Data

Oct. 21, 2002 (DE) .......................................... 102 48 949

(51) Int. Cl.$^7$ ............................................... C08G 18/42
(52) U.S. Cl. ........................... 528/76; 528/77; 528/59; 528/67; 521/160; 521/172; 521/159
(58) Field of Search ............................... 528/76, 77, 59, 528/67; 521/160, 172, 159

(56) References Cited

U.S. PATENT DOCUMENTS

| | | | |
|---|---|---|---|
| 3,370,996 A | 2/1968 | Lubowitz et al. ............. | 149/20 |
| 4,487,853 A | 12/1984 | Reichel et al. ............... | 521/172 |
| 4,605,729 A | 8/1986 | Barnes et al. ................ | 528/301 |
| 5,436,314 A | 7/1995 | Yang et al. .................. | 528/274 |
| 5,453,480 A | 9/1995 | Mueller-Hagen et al. ... | 528/301 |
| 5,488,074 A | 1/1996 | Mueller-Hagen et al. ... | 521/172 |
| 5,750,580 A | 5/1998 | Mayer et al. ................. | 521/51 |

FOREIGN PATENT DOCUMENTS

| | | |
|---|---|---|
| DE | 2 110 278 | 7/1972 |
| DE | 198 58 104 | 6/2000 |
| DE | 199 27 188 | 12/2000 |
| WO | 01/27185 | 4/2001 |

OTHER PUBLICATIONS

J. Elastomers and Plastics, vol. 26, Oct. 1994, pp. 327–334, B. P omi ska–Michalak, R. Lisowska and A. Balas, "Properties of Poly(Ester–Ether) Microcellular Urethane Elastomer System".

*Primary Examiner*—Rachel Gorr
(74) *Attorney, Agent, or Firm*—Joseph C. Gil; Lyndanne M. Whalen

(57) ABSTRACT

Polyurethane elastomers having a defined node density are produced from specific polyetherester polyols. These elastomers are particularly useful for the production of microcellular and solid polyurethane elastomer components.

8 Claims, No Drawings

POLYURETHANE ELASTOMERS AND PROCESSES FOR THEIR PREPARATION AND USE

BACKGROUND OF THE INVENTION

The invention relates to polyurethane elastomers having a defined node density, a process for their preparation with specific polyetherester polyols, and use of such elastomers, in particular, for the production of microcellular and solid polyurethane elastomer components.

Processes for preparing polyurethanes which comprise in the so-called soft segment both polyether groups and polyester groups simultaneously have been described in the prior art.

In the process described in Plominska-Michalak, B.; Lisoska, R.; Balas, A. *Journal of Elastomers and Plastics* (26) 1994, pages 327–334, a polyether-based NCO prepolymer is reacted with a polyester polyol. In the resulting polyurethane elastomer, abrasion is reduced, the long-term flexural strength at room temperature and −15° C. is improved, and the viscosity of the NCO prepolymer is lowered by comparison with a polyester-based NCO prepolymer. However, one of the disadvantages of this process is that mixing of the components becomes more difficult due to the great difference in viscosity between the reaction components. Another disadvantage of this process is the inherent risk of microphase separations in the so-called soft segment of the polyurethane elastomer, which impair the end properties.

In DE-A 199 27 188, physical mixing of polyethers and polyesters in the polyol formulation is disclosed. In this way, polyurethanes which have improved oil resistance compared with that of pure polyether polyurethanes can be obtained. The inadequate storage life of the polyol formulations is disadvantageous because the low compatibility of polyesters and polyethers brings about macroscopic demixing after a relatively short time. Users of such a system experience undesirable difficulties in terms of storage and logistics.

These disadvantages may be circumvented with the use of separation-stable polyetherester polyols which can be prepared by discontinuous synthesis processes such as: insertion in polyethers, alkoxylation of a polyester with alkylene oxide, polycondensation with alkylene oxide, two-stage and single-stage polycondensation.

In practice, however, it has been found that such polyetherester polyols do not produce polyurethanes (PUs) having generally good long-term flexural strength, particularly if they have been exposed to hydrolytic ageing.

In U.S. Pat. No. 5,436,314 (insertion in polyethers), carboxylic acids or carboxylic acid anhydrides are reacted with polyether polyols in the presence of strong Brönsted acids, and polyetherester polyols having randomly distributed ester groups are obtained. However, these products do not have polymethylene segments of different lengths, though they contribute substantially to the good properties of many polyesters. The metal salts of strong Brönsted acids furthermore contaminate the polyetheresters and diminish the hydrolytic stability of their ester bonds to such an extent that their use in, for example, shoe soles results in inferior materials.

When alkoxylating a polyester with alkylene oxide, polyesters are first prepared and then alkoxylated with alkylene oxide. This is a widespread method which results in 3-block copolymers, the polyester-block-polyether polyols. An inherent disadvantage of the process is that the block structure of the polyether-block-polyester polyols, created with such an outlay, is not in transesterification equilibrium. For this reason, they may rearrange at elevated temperature and lose their constitutional structure. This has an undesirable effect on their storage stability.

In DE-A 198 58 104, a polyestercarboxylic acid is synthesized in the first stage from ring esters, alcohols and carboxylic acids, and in the subsequent step is alkoxylated with ethylene oxide or propylene oxide, preferably without additional catalysts. The products serve as raw materials for rigid foams. They reduce shrinkage, increase strength and reduce the tendency to crystallize. These advantages can, however, be realized only when at least one polyol component or one isocyanate has a number average functionality markedly greater than 2, which enables a highly cross-linked polyurethane system to be constructed. As is generally known in the art, microcellular elastomers having good properties such as, for example, good long-term flexural strength cannot be obtained in this way. The ring esters from which the polyester polyols of the first synthesis step are synthesized can not be prepared without increased expense, because they must first be obtained from mixtures of linear and cyclic esters by extraction or distillation, a major disadvantage of this process.

In U.S. Pat. No. 4,487,853, acid semi-ester intermediates are prepared by esterification of polyether polyols with carboxylic acid anhydrides and then ethoxylated with an amine or tin compound catalyst. The polyester-co-polyether polyols obtained are low in ester-groups and have a high proportion of terminal primary hydroxyl groups. However, it is disadvantageous that the ether groups are used in a very high excess vis-à-vis ester groups, such that the advantages of typical polyetherester polyols or polyester-block-polyether polyols are not fully realized. Dicarboxylic acid anhydrides, which are generally costly, must be used as educts for the synthesis of adipic acid esters, which are important raw materials for polyurethane elastomers.

Double metal cyanide catalysts are used in WO 200127185. They enable ether blocks to be started on polyesterols with few by-products and unsaturated terminal groups. The products have good miscibility with ethers and esters which the specification recommends as surface-active agents or phase promoters. However, it is known that polyethers having a large number of terminal primary hydroxyl groups can not be prepared with double metal cyanide catalysts, because the ethylene oxide polymerization starts on a small number of hydroxyl groups where it constructs high molecular weight polyethylene oxide units. For this reason, the polyester-block-polyether polyols disclosed in WO 200127185 have only limited use in polyol formulations, specifically when polyols having a majority of secondary hydroxyl groups of low reactivity are suitable for the application. This limitation is a major disadvantage for many applications.

In DE-A 21 10 278 (polycondensation with alkylene oxide), polyether polyol, carboxylic acid anhydride and alkylene oxide react in a one-pot process to give polyetherester polyol having randomly distributed polyether units. Because of the nature of the process, the alkylene oxides form only derivatized dimethylene bridges. Longer carbon bridges, such as those used in butanediol esters or hexanediol esters, are lacking. Costly adipic acid anhydride must be used in this process.

In DE-A 34 37 915 (two-stage polycondensation), a polyether polyol is reacted with a carboxylic acid or a carboxylic acid anhydride or a carboxylic acid ester to obtain a polyestercarboxylic acid which in a second step is reacted with aliphatic alcohols to give the actual polyether-ester polyol. Disadvantages of this process are, on the one hand, the multi-stage process and, on the other, the costly carboxylic acid derivatives. A similar process is described in DE-A 34 37 915. In this process, a traditional polyester polycarboxylic acid is not constructed from polyether polyols, but is reacted with polyether polyols and aliphatic alkanols.

According to EP-A 0 601 470 (single-step polycondensation), polycarboxylic acids, alkanediol mixtures and polyether polyols are condensed to give randomly distributed polyetherester polyols having a ratio of ether groups to ester groups in the polyetherester polyol of from 0.3 to 1.5. The particular advantage of this process resides in the fact that polyurethane flexible foams having reduced fogging can be prepared by reacting these polyetherester polyols with polyisocyanates.

SUMMARY OF THE INVENTION

The object of the present invention is to provide microcellular polyurethanes which have improved long-term flexural properties at room temperature, at −15° C. and after hydrolytic ageing (at 70° C. and 95% atmospheric humidity for 7 days). This object is achieved with polyurethane elastomers having a node density of from 0.1 mole/kg to 0.0001 mole/kg. Such elastomers are produced by reacting at least one polyetherester polyol having a number average molecular weight of from about 1000 to about 6000 g/mol, an average functionality of from 1.9 to 2.5 and a ratio of ether groups to ester groups of from 0.3 to 2.5 with a polyisocyanate.

DETAILED DESCRIPTION OF THE INVENTION

It has surprisingly been found that polyetherester polyols that include alkane polyol mixtures and specific polyether polyols, having a number average functionality of from 1.9 to 2.5, preferably 1.95 to 2.1, most preferably 2.001 to 2.08, and a ratio of ether groups to ester groups of preferably from 0.3 to 2.5, more preferably from 0.6 to 2.0 and most preferably from 0.9 to 1.5, react with polyisocyanates to give hydrolysis-resistant polyurethane elastomers which have very good long-term flexural strength both before and after hydrolytic ageing, provided that the node density of the polyurethane elastomers is from 0.1 mole/kg to 0.0001 mole/kg, preferably from 0.08 to 0.001 mole/kg, most preferably from 0.04 to 0.01 mole/kg.

The term "node density of the polyurethane elastomers" (unit: [mole/kg]) means the number of trivalent permanent chemical cross-linking sites of the polyurethane elastomer in moles per kilogram of polyurethane elastomer. In determining this number, the amounts of all of the molecules of the starting raw materials having a functionality greater than 2 from which the polyurethane elastomer is produced are included. In order to be able to treat all cross-linking sites as trifunctional cross-linking sites, the functionalities of higher-functional molecular species are weighted differently: trifunctional molecules are weighted at 1; tetrafunctional molecules at 2; pentafunctional molecules at 3; hexafunctional molecules at 4; and so on. In accordance with this definition, a polyurethane prepared from the equivalently-foamed components polyester diol, 1,4-butanediol, triethanolamine, pentaerythritol with a mixture of 1.21 wt. % 2,4'-diphenylmethane diisocyanate and 98.79 wt. % 4,4'-diphenylmethane diisocyanate would have an elastomer node density of 0.69 mole/kg, as can be seen from the calculation given as an example in the Table below.

TABLE

Example of calculation of elastomer node density

| Component | Mass [g] | Molecular weight [g/mol] | Amount of substance [mole] | Functionality | Weighted trifunction-al cross-linking points per molecule | Cross-linking points [mole/ 100 g] | Cross-linking points [mole/kg] |
|---|---|---|---|---|---|---|---|
| Polyester diol | 35.47 | 3032.43 | 0.0117 | 2 | 0 | 0.000 | 0.00 |
| 1,4-Butanediol | 8.87 | 90.12 | 0.0984 | 2 | 0 | 0.000 | 0.00 |
| Triethanolamine | 4.43 | 149.20 | 0.0297 | 3 | 1 | 0.030 | 0.30 |
| Pentaerythritol | 2.66 | 136.20 | 0.0195 | 4 | 2 | 0.039 | 0.39 |
| MDI* | 48.57 | 250.75 | 0.1937 | 2 | 0 | 0.000 | 0.00 |
| Total | 100.00 | Total cross-linking points = elastomer node density [mole/kg] | | | | | 0.69 |

The present invention therefore provides polyurethane elastomers which have a node density of from 0.1 mole/kg to 0.0001 mole/kg, preferably from 0.08 to 0.001 mole/kg, most preferably from 0.04 to 0.01 mole/kg, obtainable by reacting a) at least one polyetherester polyol having a number average molecular weight of from 1000 g/mol to 6000 g/mol, preferably from 2500 g/mol to 5000 g/mol, a number average functionality of from 1.9 to 2.5, preferably from 1.95 to 2.1 and most preferably from 2.001 to 2.08, and a ratio of ether groups to ester groups of the polyetherester of from 0.3 to 2.5, preferably from 0.6 to 2.0, most preferably from 0.9 to 1.5, which is obtainable by polycondensation from a1) one or more dicarboxylic acids having up to 12 carbon atoms and/or derivatives thereof, a2) one or more polyether polyols having a number average molecular weight of from 1000 g/mol to 6000 g/mol, preferably from 2500 g/mol to 5000 g/mol, an average functionality of from 1.7 to 2.5 as well as a 70% to 100% primary OH group content, preferably an 85% to 96% primary OH group content, and a3) one or more polyols having a number average molecular weight of from 18 to 750 g/mol, preferably from 18 g/mol to 400 g/mol, most preferably from 62 g/mol to 200 g/mol, a number average functionality of from 2 to 8 and having at least 2 terminal (primary) OH groups per molecule, b) optionally, one or more polymer polyols which have OH numbers of from 10 to 149 and average functionalities of from 1.7 to 4, preferably from 1.8 to 3.5 and which comprise from 1 to 50 wt. %, preferably from 1 to 45 wt. %, fillers, in relation to the polymer polyol, c) one or more low molecular weight chain extenders having average functionalities of from 1.8 to 2.1 and having a number average molecular weight of from 18 g/mol to 750 g/mol, preferably from 18 g/mol to 400 g/mol, preferably from 62 g/mol to 200 g/mol, and/or cross-linking agents having average functionalities of from 2.2 to 8, preferably from 2.5 to 4, and having a number average molecular weight of from 18 g/mol to 750 g/mol, preferably from 18 g/mol to 400 g/mol, most preferably 62 g/mol to 200 g/mol, in the presence of d) optionally, one or more catalysts, e) optionally, one or more blowing agents and f) optionally, additives, with g) at least one polyisocyanate selected from the group comprising g1) organic polyisocyanates, g2) modified polyisocyanates and g3) NCO prepolymers based on g1) and/or g2) and a polyol x), wherein the polyol x) is selected from the group comprising x1) polyester polyols, x2) polyetherester polyols and x3) mixtures of x1) and x2), g4) as well as mixtures of g1), g2) and g3).

The term "polyetherester polyol" as used herein means a compound which has ether groups, ester groups and OH groups.

The polyetherester polyols a) which are to be used according to the invention have a number average molecular weight of from 1000 g/mol to 6000 g/mol, preferably from 2500 g/mol to 5000 g/mol, a number average hydroxyl functionality of from 1.9 to 2.5, preferably from 1.95 to 2.1 and most preferably from 2.001 to 2.08, and a ratio of ether groups to ester groups of from 0.3 to 2.5, preferably from 0.6 to 2.0 and most preferably from 0.9 to 1.5.

Organic dicarboxylic acids a1) having up to 12 carbon atoms are suitable for the preparation of the polyetherester polyols, preferably aliphatic dicarboxylic acids having 4 to 6 carbon atoms, which are used either individually or in mixture. Examples of suitable dicarboxylic acids are suberic acid, azelaic acid, decanedicarboxylic acid, maleic acid, malonic acid, phthalic acid, pimelic acid and sebacic acid, preferably glutaric acid, fumaric acid, succinic acid and adipic acid. Anhydrides of dicarboxylic acids as well as esters and semiesters thereof with low molecular weight monofunctional alcohols having 1 to 4 carbon atoms are examples of derivatives of these acids which may be used.

As the component a2) for the preparation of the polyetherester polyols, polyether polyols obtained by the alkoxylation of starter molecules, preferably polyhydric alcohols may be used. The starter molecules are at least bifunctional, but may optionally also comprise higher-functional, in particular trifunctional, starter molecule contents. The alkoxylation is normally effected in two steps. Alkoxylation first takes place with preferably propylene oxide or less preferably 1,2-butylene oxide or even less preferably 2,3-butylene oxide in the presence of a basic catalyst or double metal cyanide catalyst, and is followed by ethoxylation with ethylene oxide. The ethylene oxide content of the polyether polyol is from 10 wt. % to 40 wt. %, preferably from 15 wt. % to 35 wt. %.

The component a3) preferably includes diols having primary OH groups and number average molecular weights of ≦750 g/mol, preferably from 18 g/mol to 400 g/mol, most preferably from 62 g/mol to 200 g/mol. Examples of such diols include: 1,2-ethanediol, 1,3-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butine-1,4-diol, ether diols such as diethyl ene glycol, triethylene glycol, tetraethylene glycol, dibutylene glycol, tributylene glycol, tetrabutylene glycol, dihexylene glycol, trihexylene glycol, tetrahexylene glycol and oligomer mixtures of alkylene glycols, such as diethylene glycol.

In addition to the diols, polyols having number average functionalities of from >2 to 8, preferably from 2.1 to 5, most preferably from 3 to 4, may also be used. Examples of such polyols include: 1,1,1-trimethylolpropane, triethanolamine, glycerol, sorbitan and pentaerythritol as well as polyethylene oxide polyols which have average molecular weights of less than 750 g/mol, preferably from 18 g/mol to 400 g/mol, most preferably from 62 g/mol to 200 g/mol and are started on triols or tetra-ols.

Each member of the diols group may be used alone or in combination with any other diols and/or polyols. The diols and polyols may also be added subsequently to a polyester polyol, even if they are not reacted thereby or are not reacted until the polycondensation equilibrium is reached in the esterification reaction. The relative quantity of polyols used is limited by the given number average hydroxyl functionality of the polyetherester polyol a).

Polymer-modified polyols, in particular graft polymer polyols based on polyethers, polyesters or polyetheresters, are suitable as the polymer polyols b). Suitable graft components are, in particular, those based on styrene and/or acrylonitrile, which have been prepared by in situ polymerization of acrylonitrile, styrene or preferably mixtures of styrene and acrylonitrile, for example in a ratio by weight of from 90:10 to 10:90, preferably from 70:30 to 30:70. Polyol dispersions which comprise as the disperse phase (normally in quantities of from 1 to 50 wt. %, preferably 1 to 45 wt. %, in relation to polymer polyol) fillers, for example, inorganic fillers, polyureas (PHDs), polyhydrazides, polyurethanes comprising bound tert.-amino groups, and/or melamine are also suitable as the component b).

In order to prepare the polyurethane elastomers according to the invention, low molecular weight bifunctional chain extenders, cross-linking agents having number average functionalities of from 2.2 to 8 or mixtures of chain extenders and cross-linking agents are used as the component c).

Such chain extenders and cross-linking agents c) are used in order to modify the mechanical properties, in particular the hardness, of the polyurethane elastomers. Suitable chain extenders are compounds such as those described under component a3), as well as diesters of terephthalic acid with glycols having 2 to 4 carbon atoms, such as, for example, terephthalic acid-bis-2-hydroxyethyl ester and terephthalic acid-bis-4-hydroxybutyl ester; hydroxyalkylene ethers of hydroquinone or resorcinol, such as, for example, 1,4-di-(β-hydroxyethyl) hydroquinone and 1,3-(β-hydroxyethyl) resorcinol; N-alkyldialkanolamines having 2 to 12, carbon atoms, for example N-methyl- and N-ethyl diethanolamine. In addition to the cross-linking agents named under component a3), suitable crosslinking agents are, for example, triols, tetraols, oligomeric polyalkylene polyols, aromatic and aliphatic amines and diamines having a functionality of from 2.2 to 8, preferably from 3 to 4, which typically have molecular weights of $\leq 750$ g/mol, preferably 18 to 400 g/mol, most preferably 62 to 200 g/mol.

The relative quantity of polyene and tetra-ols used is limited by the given node density of the polyurethane elastomers according to the invention in combination with the average hydroxyl functionality of the polyetherester polyol a).

The compounds of the component c) may be used in the form of mixtures or individually. Mixtures of chain extenders and cross-linking agents are also usable.

As the component d), amine catalysts such as those currently being used by those skilled include tertiary amines such as triethylamine, tributylamine, N-methylmorpholine, N-ethylmorpholine, N,N,N',N'-tetramethyl ethylenediamine, pentamethyl diethylenetriamine and higher homologues, 1,4-diazabicyclo-[2,2,2]-octane, N-methyl-N'-dimethylamino-ethyl piperazine, bis(dimethylaminoalkyl)-piperazine, N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, bis(dimethylaminopropyl) urea, bis(dimethylaminopropyl)amine, 1,2-dimethyl-imidazole, 2-methylimidazole, diazabicycloundecene, monocyclic and bicyclic amidines, bis(dialkylamino) alkyl ethers such as bis(dimethylaminoethyl) ether, as well as tertiary amines having amide groups (preferably formamide groups). The following are also useful catalysts: Mannich bases prepared from secondary amines, which are known such as dimethylamine, and aldehydes, preferably formaldehyde, or ketones such as acetone, methyl ethyl ketone, or cyclohexanone and phenols such as phenol, N-nonylphenol or bisphenol A. Tertiary amines having hydrogen atoms which are Zerewitinoff-active vis-à-vis isocyanate groups, useful as a catalyst are, for example, triethanolamine, riisopropanolamine, N-methyldiethanolamine, N-ethyldiethanolamine, N,N-dimethylethanolamine, reaction products thereof with alkylene oxides such as propylene oxide and/or ethylene oxide, as well as secondary-tertiary amines. Silaamines having carbon-silicon bonds may also be used as catalysts include 2,2,4-trimethyl-2-silamorpholine and 1,3-diethylaminomethyl tetramethyldisiloxane. Nitrogenous bases such as tetraalkylammonium hydroxides and hexahydrotriazines are also considered to be suitable catalysts. The reaction between NCO groups and Zerewitinoff-active hydrogen atoms is also greatly accelerated by lactams and azalactams.

Compact polyurethane elastomers, for example polyurethane shoe outer soles, can be produced in the absence of moisture and physically or chemically acting blowing agents.

For the preparation of microcellular polyurethane elastomers, water is preferably used as the blowing agent e). Water reacts in situ with the isocyanate component g) to form carbon dioxide and amino groups which react further with other isocyanate groups to give urea groups, and act, in this instance, as chain extenders.

Where water is added to the polyurethane formulation in order to adjust the desired density, the water is normally used in quantities of from 0.001 to 3.0 wt. %, preferably from 0.01 to 2.0 wt. % and most preferably from 0.05 to 1.0 wt. %, in relation to the total weight of the components a) to f).

Gases or highly volatile inorganic or organic substances which vaporize under the influence of the exothermic polyaddition reaction and preferably have a boiling point at standard pressure within the range of from −40 to 120° C., preferably from −30 to 90° C., are physical blowing agents useful as the blowing agent e) in place of water or preferably in combination with water. Acetone, ethyl acetate, halogen-substituted alkanes or perhalogenated alkanes such as R134a, R141b, R365mfc, R245fa, n-butane, iso-butane, iso-pentane, n-pentane, cyclopentane, n-hexane, isohexane, cyclohexane, n-heptane, iso-heptane or diethyl ether, for example, are considered organic blowing agents, and air, $CO_2$ or $N_2O$, for example, are considered inorganic blowing agents. A blowing action can also be obtained by the addition of compounds which decompose at temperatures above room temperature with separation of gases, for example of nitrogen and/or carbon dioxide. Such decomposition occurs in azo compounds, for example azodicarbon-amide or azo-bis-isobutyric acid nitrile, or salts such as ammonium bicarbonate, ammonium carbamate or ammonium salts of organic carboxylic acids, for example monoammonium salts of malonic acid, boric acid, formic acid or ethanoic acid. Further examples of blowing agents, as well as details regarding the use of blowing agents, are described in R. Vieweg, A. Höchtlen (ed.): "Kunststoff-Handbuch", Vol. VII, Carl-Hanser-Verlag, Munich, $3^{rd}$ edition, 1993, pp. 115 to 118 and 710 to 715.

The quantity of solid blowing agents, low-boiling liquids or gases, which in each case may be used individually or in the form of mixtures (for example, as liquid or gas mixtures or as gas-liquid mixtures) which is expedient to use is naturally dependent on the density sought and the quantity of water used. The necessary quantities can be readily determined experimentally. Solid, liquid and/or gas quantities of from 0.01 to 35 wt. %, preferably from 0.1 to 6 wt. %, in each case in relation to the total weight of the components a) to f), normally deliver satisfactory results. The gas, for example, air, carbon dioxide, nitrogen and/or helium, can be introduced by way of the higher molecular weight polyhydroxyl compounds a) and b) and/or by way of the compounds d) and f) and/or by way of the polyisocyanate(s) g).

The reaction mixture for the preparation of the compact or cellular polyurethane elastomers may optionally be provided with additives f). Examples of such additives are surface-active additives such as emulsifiers, foam stabilizers, cell regulators, flame retardants, nucleating agents, oxidation retardants, stabilizers, lubricants and mold release agents, dyes, dispersion aids and pigments. The sodium salts of castor oil sulfonates or salts of fatty acids with amines such as oleic acid diethylamine or stearic acid diethanolamine, for example, are considered emulsifiers. Alkali metal salts or ammonium salts of sulfonic acids such as, for instance, of dodecylbenzenesulfonic acid or dinaphthylmethane disulfonic acid or of fatty acids such as ricinoleic acid or of polymeric fatty acids may also be co-used as surface-active additives. Polyether siloxanes, specifically those which are water-soluble, are considered foam stabilizers. These compounds are generally constructed such that a copolymer of ethylene oxide and propylene oxide is combined with a polydimethylsiloxane radical. Polysiloxane-polyoxyalkylene copolymers having multiple branchings by way of allophanate groups are particularly attractive. Other organopolysiloxanes, oxyethylated alkylphenols, oxyethylated fatty alcohols, paraffin oils, castor oil acid esters or ricinoleic acid esters, sulfonated castor oil, peanut oil and cell regulators such as paraffins, fatty alcohols and polydimethyl siloxanes are also suitable. In order to improve the emulsifying action, the dispersion of the filler, the cell structure and/or in order to stabilize it, oligomeric polyacrylates having polyoxyalkylene radicals and fluoroalkane radicals as side groups are also suitable. The surface-active substances are normally employed in quantities of from 0.01 to 5 parts by weight, in relation to 100 parts by weight of the higher molecular weight polyhydroxyl compounds a) and b). Reaction retardants, antistatic agents such as, for example, Catafor®Ca 100, pigments or dyes and flame retardants which are known, and stabilizers against the effects of ageing and weathering, plasticizers and fungistats and bacteriostats may also be included in the reaction mixture.

Further examples of surface-active additives and foam stabilizers, as well as cell regulators, reaction retardants, stabilizers, flame-retardant substances, plasticizers, dyes and fillers as well as fungistats and bacteriostats which are optionally co-used, as well as details regarding the mode of use and action of these additives are described in R. Vieweg, A. Höchtlen (ed.): "Kunststoff-Handbuch", Vol. VII, Carl-Hanser-Verlag, Munich, $3^{rd}$ edition, 1993, pp. 118 to 124.

Any of the aliphatic, cycloaliphatic, araliphatic, aromatic and heterocyclic polyisocyanates corresponding to the formula $$Q(NCO)_n$$

in which n=2 to 7, preferably 2, and Q denotes an aliphatic hydrocarbon radical having from 2 to 18, preferably from 6 to 10, C atoms, a cycloaliphatic hydrocarbon radical having from 4 to 15, preferably from 5 to 10, C atoms, an aromatic hydrocarbon radical having from 6 to 15, preferably from 6 to 13, C atoms, or an araliphatic hydrocarbon radical having from 8 to 15, preferably from 8 to 13, C atoms, are suitable as the component g1). Examples of suitable isocyanates include: 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate and cyclohexane-1,4-diisocyanate, 1-isocyanato-3,3,5-trimethyl-5-isocyanatomethyl cyclohexane (IPDI), 2,4- and 2,6-hexahydrotolylene diisocyanate, hexahydro-1,3- and -1,4-phenylene diisocyanate, perhydro-2,4'-diphenylmethane diisocyanate, perhydro-4,4'-diphenylmethane diisocyanate, 1,3- and 1,4-phenylene diisocyanate, 1,4-naphthalene diisocyanate (1,4-NDI), 1,5-naphthalene diisocyanate (1,5-NDI), 1,4-durene diisocyanate (DDI), 4,4'-stilbene diisocyanate, 3,3'-dimethyl-4,4'-biphenylene diisocyanate (TODI), 2,4- and 2,6-tolylene diisocyanate (TDI), diphenylmethane-2,4'-diisocyanate, diphenylmethane-2,2'-diisocyanate and diphenylmethane-4,4'-diisocyanate (MDI) and polynuclear representatives of the diphenylmethane diisocyanate series. The named compounds and isomers thereof may in each case be used individually or in the form of mixtures.

The industrially readily accessible polyisocyanates such as 2,4- and 2,6-tolylene diisocyanate, naphthylene-1,5-diisocyanate, 4,4'-diphenylmethane diisocyanate, 2,4'-diphenylmethane diisocyanate, 2,2'-diphenylmethane diisocyanate and polyphenyl polymethylene polyisocyanates, as prepared by aniline-formaldehyde condensation followed by phosgenation ("raw MDI"), are preferably used. The polyisocyanates may be used individually or in the form of mixtures.

Mixtures of 4,4'-diphenylmethane diisocyanate and 2,4'-diphenylmethane diisocyanate are particularly preferred.

The following are suitable modified isocyanates g2): polyisocyanates having carbodiimide groups such as bis(4,4'-diphenylmethane) carbodiimide; polyisocyanates having allophanate groups; polyisocyanates having isocyanurate groups; polyisocyanates having urethane groups; polyisocyanates having acylated urea groups; polyisocyanates having biuret groups; polyisocyanates prepared by telomerization reactions; reaction products of the aforementioned isocyanates with acetals; and polyisocyanates comprising polymeric fatty acid esters.

Modified polyisocyanates such as those derived from 2,4- and/or 2,6-tolylene diisocyanate, from 4,4'- and/or 2,4'-diphenylmethane diisocyanate or from naphthylene-1,5-diisocyanate, and mixtures thereof are particularly preferred.

The polyester polyols x2) are prepared by condensation of one or more dicarboxylic acids a1) with at least one polyol selected from components a3), c) and/or other short-chain polyols y) and with at least one long-chain polyol selected from components a2) or z).

The polyetherester polyols x2) may be identical to the polyetherester polyols a). They may, however, also be prepared based on polyether polyols or mixtures of a plurality of polyether polyols z) having a number average molecular weight of from 1000 g/mol to 6000 g/mol, preferably from 2500 g/mol to 5000 g/mol, and having an average functionality of from 1.7 to 2.5 and less than 70% primary OH groups. These polyether polyols z) are obtained by alkoxylation of starter molecules, preferably alcohols. The starter molecules are at least bifunctional, but may optionally also comprise higher-functional, in particular trifunctional, starter molecule contents. The alkoxylation takes place in two steps. Alkoxylation with propylene oxide, 1,2-butylene oxide or 2,3-butylene oxide first takes place with basic catalysis or with double metal cyanide catalysis, and ethoxylation optionally follows. The ethylene oxide content of the polyether is between 0 wt. % and 10 wt. %.

As the component y), cross-linking agents and chain extenders such as are described under c) and/or polyols having an average hydroxyl functionality of from 2 to 8, having one or two secondary hydroxyl groups and number average molecular weights of less than 750 g/mol may be used. They include saturated and unsaturated aliphatic diols such as 1,2-propanediol, 1,2-butanediol, 1,3-butane-diol, ether diols such as dipropylene glycol, tripropylene glycol, tetrapropylene glycol, di-1,2-butylene glycol, tri-1,2-butylene glycol, tetra-1,2-butylene glycol, di-1,3-butylene glycol, tri-1,3-butylene glycol, tetra-1,3-butylene glycol and oligomer mixtures thereof.

In addition to the diols, polypropylene oxide polyols started on triols or tetra-ols, for example 1,1,1-trimethylolpropane, triethanolamine, glycerol and pentaerythritol having average molecular weights of less than 750 g/mol can also be used.

Each compound from the diols group may be used alone or in combination with further diols and/or polyhydric polyols. These diols or polyols can also be added subsequently to a polyester polyol, even if as a result they are not reacted or are not reacted until the polycondensation equilibrium has been reached in the esterification reaction. The relative quantity of polyols used is limited by the given number average hydroxyl functionality of the polyetherester polyol x2) and the given node density for the polyurethane elastomer.

The polyester polyols x1) are prepared by condensation of one or more dicarboxylic acids a1) with at least one polyol or a plurality of polyols according to a3), c) and/or y).

The present invention also provides a process for the preparation of the polyurethane elastomers according to the invention in which a) at least one polyetherester polyol having a number average molecular weight of from 1000 g/mol to 6000 g/mol, having a number average functionality of from 1.9 to 2.5 and a ratio of ether groups to ester groups of the polyetherester of from 0.3 to 2.5,
   which is obtainable by polycondensation from
   a1) at least one or a plurality of dicarboxylic acids having up to 12 carbon atoms and/or derivatives thereof,
   a2) at least one or a plurality of polyether polyols having a number average molecular weight of from 1000 g/mol to 6000 g/mol, having an average functionality of from 1.7 to 2.5 and a primary OH group content of from 70% to 100% and
   a3) at least one or a plurality of polyols having a number average molecular weight of from 18 to 750 g/mol, a number average functionality of from 2 to 8 and at least 2 terminal OH groups per molecule,
b) optionally polymer polyols which have an OH number of from 10 to 149 and average functionalities of from 1.7 to 4, and which comprise from 1 to 50 wt. % fillers, in relation to the polymer polyol,
c) low molecular weight chain extenders having average functionalities of from 1.8 to 2.1 and having a number average molecular weight of from 18 to 750 g/mol and/or cross-linking agents having average functionalities of from 2.2 to 8 and having a number average molecular weight of from 18 to 750 g/mol, is reacted in the presence of
d) optionally catalysts,
e) optionally blowing agents and
f) optionally additives
with
g) at least one polyisocyanate selected from the group comprising
   g1) organic polyisocyanates,
   g2) modified polyisocyanates,
   g3) NCO prepolymers based on g1) and/or g2) and a polyol x),
   wherein the polyol x) is selected from the group comprising
      x1) polyester polyols,
      x2) polyetherester polyols and
      x3) mixtures of x1) and x2),
   g4) and mixtures of g1), g2) and/or g3).

In order to prepare the polyetherester polyols a) or x2), the organic, for example aromatic and preferably aliphatic, polycarboxylic acids and/or derivatives and polyols are preferably polycondensed in catalyst-free manner or in the presence of an esterification catalyst. The polycondensation reaction is expediently conducted in an atmosphere of inert gas such as nitrogen, helium, argon, in solution and also in the melt at temperatures of from 150 to 300° C., preferably 180 to 230° C., optionally at reduced pressure until the desired acid value which is advantageously less than 10, preferably less than 1 is obtained.

According to a preferred preparation process, the esterification reaction is run at standard pressure until no more condensate forms. Catalyst can then be added. The reaction is completed at a pressure of less than 500 mbar, preferably from 2 to 150 mbar. Iron catalysts, cadmium catalysts, cobalt catalysts, lead catalysts, zinc catalysts, antimony catalysts, magnesium catalysts, titanium catalysts and tin catalysts, for example, in the form of metal oxides or metal salts are useful esterification catalysts. The polycondensation may, however, also be carried out in the presence of diluents and/or entraining agents such as benzene, toluene, xylene or chlorobenzene, in order to bring about azeotropic separation of the water of condensation. Mixtures of the named agents are likewise useful.

In preparing the polyester polyols x1), the organic polycarboxylic acids and/or derivatives thereof are preferably used with polyhydric alcohols, advantageously in a quantitative ratio such that the hydroxyl groups are at all times present in numerical excess vis-à-vis carboxyl groups or carboxyl derivative groups.

The polyurethane elastomers according to the invention are preferably prepared by the prepolymer process, wherein the prepolymer g3) may be obtained by reacting at least one polyol or a plurality of polyols x) with at least one or a plurality of isocyanates g1) and optionally modified isocyanates g2) as well as optionally short-chain polyols a3) and/or y) and/or c).

In order to prepare the solid or microcellular polyurethane elastomers according to the invention, isocyanates g) comprising the component g1) with optionally the component g2) or preferably the NCO prepolymer g3) are preferably reacted with at least one polyetherester polyol a) and low molecular weight chain extender(s) and/or cross-linking agent(s) c) optionally with the addition of catalyst(s) d), blowing agent(s) e) and additive(s) f).

In order to prepare the polyurethane elastomers according to the invention, the components are reacted in quantities such that the equivalent ratio of the NCO groups of the isocyanate g) to the sum of the hydrogen atoms of the components a), b), c), d) and f), which are reactive to isocyanate groups, as well as any chemically acting blowing agents e) which may be used, is from 0.8:1 to 1.2:1, preferably from 0.95:1 to 1.15:1 and most preferably from 1.00:1 to 1.05:1.

According to the invention, all the components, taking into account their isocyanate functionalities and hydroxyl functionalities, are furthermore combined in amounts such that the resulting polyurethane elastomer has a node density of between 0.1 mole/kg and 0.0001 mole/kg, preferably between 0.001 and 0.08 mole/kg, most preferably between 0.01 and 0.04 mole/kg.

The polyurethane elastomers according to the invention are preferably used in the production of shoe components, in particular shoe soles.

The invention will be explained in further detail by reference to the Examples which follow.

EXAMPLES

The polyurethane elastomer was obtained by equivalent reaction of a polyol formulation α and an NCO prepolymer β (average functionality 2.01). The compositions of the polyol formulation α and the NCO prepolymer β can be seen in Table 2. The physical properties of the polyurethane elastomers according to the invention are listed in Table 3.

The general directions for preparing the polyetherester polyols are described taking polyetherester polyol C as an example:

4662 g (53.7 mole) of a hydroxy-functional polyether P (hydroxyl number 28; number average hydroxyl functionality 1.81; primary hydroxyl groups 90 mol. % (propylene glycol as the starter; 68.7 wt. % propylene oxide; 29.4 wt. % ethylene oxide)), 426 g (4 mole) diethylene glycol, 417 g (4.8 mole) ethylene glycol, 767 g (8.8 mole) 1,4-butanediol, 15 g (0.1 mole) trimethylolpropane and 2461 g (16.8 mole) adipic acid were heated to a melt in a 10-liter four-necked round flask equipped with a stirrer, packed column, descending condenser and thermometer as well as a vacuum pump and heating mantle, with nitrogen being passed through the apparatus. Heating to 180° C. was continued until no further water separated out. 200 mg tin(II) chloride were then added, a vacuum was applied slowly, and the temperature was raised to 200° C. Stirring continued for 2 hours at 200° C. and 5 mbar in order to complete the reaction. A polyetherester having an acid value of 0.3, a hydroxyl number of 34.6 and a viscosity of 930 mPa·s at 75° C. was obtained. The starting compounds as well as the physical data of the polyetherester polyols and the polyester polyols can be seen in Table 1.

The polyurethane test pieces were prepared such that the polyol formulation α at 55° C. was mixed with a toothed mixer at 3000 rpm in a low-pressure foaming unit with the NCO prepolymer β at 40°, the mixture was poured into an aluminum hinged mold (200×140×10 mm) temperature-controlled at 50° C., the hinged mold was closed, and the polyurethane elastomer was demolded after 3.5 minutes.

Following 24 hours' storage, the Shore A hardness in accordance with DIN 53 505 was determined by means of blue gel on the polyurethane elastomer slabs thus obtained. The stab-type crack growth in accordance with DIN 53 522 of a 2 mm wide stab through the bending line of test pieces (2 cm×15 cm×1 cm) backed with a Texon strip was furthermore determined after 30,000 bending cycles. The results are set out in Table 3. The flexing endurance tests were performed at room temperature and at −15° C. Test pieces were additionally aged for 7 days at 95% atmospheric humidity and 70° C., dried for 24 hours at 70° C., reconditioned for a further 24 hours at room temperature, after which they underwent a flexing endurance test at room temperature. Abrasion was determined in accordance with DIN 53516, and the fuel resistance was determined in accordance with EN 344.

TABLE 1

Polyetherester polyols C, E to O, as well as polyester polyols A, B and D

| | | | | | | Component a3) | | | | | |
|---|---|---|---|---|---|---|---|---|---|---|---|
| | OH[1] | AV[2] | Visc[3] | MW[4] | Funct.[5] | EG[6] | 1,4 BD[7] | DEG[8] | TmP[9] | Polyether P[10] | AA[11] |
| A | 29.0 | 0.5 | 2800 | 3869 | 2.000 | 0.2076 | 0.1291 | — | — | — | 0.663 |
| B | 37.0 | 0.7 | 1900 | 3032 | 2.000 | 0.2085 | 0.1300 | — | — | — | 0.661 |
| C | 34.6 | 0.3 | 930 | 3303 | 2.037 | 0.0481 | 0.0883 | 0.0403 | 0.0017 | 0.5379 | 0.284 |
| D | 35.7 | 0.6 | 1900 | 3201 | 2.037 | 0.1006 | 0.1888 | 0.0861 | 0.0016 | — | 0.623 |
| E | 35.0 | 0.6 | 1350 | 3265 | 2.037 | 0.1082 | 0.0993 | 0.0453 | 0.0016 | 0.3024 | 0.443 |
| F | 38.3 | 0.4 | 830 | 2984 | 2.037 | — | 0.1524 | 0.0695 | 0.0017 | 0.4642 | 0.312 |
| G | 37.0 | 0.4 | 1330 | 3089 | 2.037 | 0.0503 | 0.1846 | 0.0421 | 0.0016 | 0.2813 | 0.440 |
| H | 37.50 | 0.3 | 960 | 3047 | 2.037 | 0.0939 | — | 0.0787 | 0.0017 | 0.5249 | 0.301 |
| I | 39.1 | 0.3 | 1070 | 2923 | 2.037 | 0.0583 | 0.1069 | 0.0976 | 0.0017 | 0.3254 | 0.410 |
| J | 34.7 | 0.4 | 1180 | 3293 | 2.037 | 0.0749 | 0.1374 | — | 0.0017 | 0.4185 | 0.368 |
| K | 37.2 | 0.4 | 1160 | 3131 | 2.076 | 0.0653 | 0.1198 | 0.0536 | 0.0033 | 0.3651 | 0.393 |
| L | 36.5 | 0.4 | 1160 | 3074 | 2.000 | 0.0667 | 0.1219 | 0.0544 | — | 0.3643 | 0.393 |
| M | 31.3 | 0.8 | 1430 | 3651 | 2.037 | 0.0670 | 0.1185 | 0.0538 | 0.0012 | 0.3623 | 0.397 |
| N | 40.4 | 0.3 | 920 | 2829 | 2.037 | 0.0659 | 0.1209 | 0.0549 | 0.0018 | 0.3675 | 0.389 |
| O | 38.90 | 0.8 | 1040 | 2942 | 2.040 | 0.0655 | 0.1231 | 0.0545 | 0.0016 | 0.3650 | 0.390 |

[1]Hydroxyl Number (mg KOH/gl)
[2]Acid Value (mg KOH/g)
[3]Viscosity at 75° C. (mPa's)
[4]Molecular Weight (g/mol)
[5]Number Average hydroxyl functionality
[6]Ethylene glycol (wt. %)
[7]1,4-Butanediol (wt. %)
[8]Diethylene glycol (wt. %)
[9]Trimethylol propane (wt. %)
[10]Polyether P (wt. %)
[11]Adipic Acid (wt. %)

TABLE 2

Compositions of polyol formulations α and the prepolymer β

| Component | [wt. %] |
|---|---|
| Polyol formulation α | |
| Butanediol | 13.01 |
| Diazabicyclooctane | 0.56 |
| Triethanolamine | 0.19 |
| Water | 0.32 |
| Foam stabilizer | 0.09 |
| Polyols B to O | 85.83 |
| | 100.00 |
| NCO prepolymer β | |
| Desmodur ® 44 M$^\alpha$ | 46.32 |
| Desmodur ® CD$^\alpha$ | 4.96 |
| Polyol A | 48.72 |
| | 100.00 |

$^\alpha$Isocyanate commercially available from Bayer Polymers LLC

TABLE 3

Properties of the polyurethane elastomer test specimens having a density of 600 kg/m$^3$

| | | | | LTFS[4] @ RT[5] | | | | LTFS[4] @ −15° C. | | | | LTFS @ RT[12] | | | | | | |
|---|---|---|---|---|---|---|---|---|---|---|---|---|---|---|---|---|---|---|
| | | | | Stab-Type[6] | | Break[7] | | Stab-Type[6] | | Break[7] | | Stab-Type[6] | | Break[7] | | | | |
| Test | Polyol[1] | Funct[2] | Shore A[3] | X[8] | W[9] | Y[10] | N[11] | X[8] | W[9] | Y[10] | N[11] | X[8] | W[9] | Y[10] | N[11] | Abr[13] | FRS[14] | Node[15] |
| *B | B | 2.0085 | 64 | 0 | | 4 | 22,500 | 2 | 4.7 | 3 | 21,667 | 0 | | 4 | 4,185 | 78 | 1 | 0.0177 |
| C' | C | 2.0142 | 63 | 4 | 3.0 | 0 | | 3 | 4.4 | 1 | 30,000 | 3 | 8.7 | 1 | 30,000 | 92 | 6 | 0.0229 |
| *D' | D | 2.0143 | 62 | 0 | | 4 | 11,300 | 0 | | 4 | 16,300 | 4 | 1.5 | 0 | | 42 | 1 | 0.0231 |
| E' | E | 2.0142 | 61 | 0 | | 4 | 20,000 | 0 | | 4 | 27,500 | 4 | 7.7 | 0 | | 68 | 1 | 0.0230 |
| F' | F | 2.0145 | 62 | 3 | 3.4 | 1 | 30,000 | 3 | 5.0 | 1 | 25,000 | 4 | 5.8 | 0 | | 70 | 7 | 0.0234 |
| G' | G | 2.0144 | 61 | 0 | | 4 | 22,500 | 0 | | 3 | 23,300 | 4 | 3.1 | 0 | | 62 | 3 | 0.0232 |
| H' | H | 2.0149 | 61 | 4 | 2.2 | 0 | | 4 | 2.2 | 0 | | 3 | 13.6 | 1 | | 94 | 6 | 0.0237 |
| I' | I | 2.0148 | 60 | 4 | 3.8 | 0 | | 4 | 4.0 | 0 | | 4 | 6.7 | 0 | | 86 | 4 | 0.0235 |
| J' | J | 2.0142 | 62 | 4 | 1.5 | 0 | | 4 | 1.2 | 0 | | 4 | 8.2 | 0 | | 68 | 5 | 0.0229 |
| K' | K | 2.0203 | 61 | 0 | | 4 | 30,000 | 3 | 9.9 | 1 | 30,000 | 4 | 2.9 | 0 | | 62 | 4 | 0.0286 |
| L' | L | 2.0085 | 60 | 4 | 1.1 | 0 | | 4 | 0.6 | 0 | | 0 | | 4 | 13,800 | 66 | 5 | 0.0177 |
| M' | M | 2.0138 | 60 | 4 | 1.6 | 0 | | 4 | 1.1 | 0 | 5,000 | 0 | | 4 | | 95 | 4 | 0.0224 |
| N' | N | 2.0148 | 61 | 2 | 9.1 | 2 | 30,000 | 3 | 6.1 | 1 | 30,000 | 4 | 4.0 | 0 | | 75 | 4 | 0.0237 |
| O' | O | 2.0146 | 64 | 4 | 1.8 | 0 | | 4 | 3.5 | 0 | | 0 | | 4 | 17.675 | 68 | 4 | 0.0235 |

*Comparison
[1]Polyol in polyol formulation α
[2]Average functionality of polyols formulation α
[3]Hardness (Shore A)
[4]Long-term flexural strength
[5]Room temperature
[6]Stab-type crack growth after 30,000 bends
[7]Break at n bends
[8]Number of test strips having stab-type crack growth
[9]Widening (nm)
[10]Number of test strips which broke
[11]Number of bends before break
[12]Long term flexural strength at room temperature following hydrolytic ageing
[13]Abrasion (ng)
[14]Fuel resistance swelling (%)
[15]Node density (mole/kg)
The sum of "x" and "y" equals the number of test strips which underwent a flexing endurance test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane elastomer having a node density of from 0.1 mole/kg to 0.0001 mole/kg comprising the reaction product of
   a) at least one polyetherester polyol having a number average molecular weight of from 1000 g/mol to 6000 g/mol, a number average functionality of from 1.9 to 2.5 and a ratio of ether groups to ester groups of from 0.3 to 2.5,
   which comprises a polycondensation product of
   a1) at least one dicarboxylic acid having up to 12 carbon atoms and/or a derivative thereof,
   a2) at least one polyether polyol having a number average molecular weight of from 1000 g/mol to 6000 g/mol, an average functionality of from 1.7 to 2.5 and from 70% to 100% primary OH groups, and
   a3) at least one polyol having a number average molecular weight of from 18 to 750 g/mol, a number average functionality of from 2 to 8 and at least 2 terminal OH groups per molecule,
   b) optionally, a polymer polyol having an OH number of from 10 to 149 and average functionality of from 1.7 to 4 and which comprises from 1 to 50 wt. % filler, in relation to the polymer polyol,
   c) a low molecular weight chain extender having an average functionality of from 1.8 to 2.1 and a number average molecular weight of from 18 to 750 g/mol and/or a cross-linking agent having an average functionality of from 2.2 to 8 and a number average molecular weight of from 18 to 750 g/mol, in the presence of
d) optionally, a catalyst,
e) optionally, a blowing agent and
f) optionally, an additive,
with
g) a polyisocyanate comprising
   g1) an organic polyisocyanate,
   g2) a modified polyisocyanate,
   g3) an isocyanate-terminated prepolymer based on g1) and/or g2) and a polyol x),
   wherein the polyol x) comprises
      x1) a polyester polyol,
      x2) a polyetherester polyol or
      x3) a mixture of x1) and x2),
   g4) or a mixture of g1), g2) and/or g3).

2. The polyurethane elastomer of claim 1 in which the polyisocyanate g1) is 4,4'-diphenylmethane diisocyanate, 2,4'-diphenylmethane diisocyanate or a mixture thereof.

3. The polyurethane elastomer of claim 1 in which the polyol a3) is 1,4-butanediol, 1,2-ethanediol, diethylene glycol, hexanediol, trimethylolpropane, sorbitan, pentaerythritol, triethanolamine or glycerol.

4. A process for the production of the polyurethane elastomer of claim 1 comprising reacting
   a) at least one polyetherester polyol having a number average molecular weight of from 1000 g/mol to 6000 g/mol, a number average functionality of from 1.9 to 2.5 and a ratio of ether groups to ester groups of from 0.3 to 2.5,
   which comprises a polycondensation product of
      a1) at least one dicarboxylic acid having up to 12 carbon atoms and/or a derivative thereof,
      a2) at least one polyether polyol having a number average molecular weight of from 1000 g/mol to 6000 g/mol, an average functionality of from 1.7 to 2.5 and 70% to 100% primary OH groups, and
      a3) at least one polyol having a number average molecular weight of from 18 to 750 g/mol, a number average functionality of from 2 to 8 and at least 2 terminal OH groups per molecule,
   b) optionally, a polymer polyol which has an OH number of from 10 to 149 and average functionality of from 1.7 to 4 and which comprises from 1 to 50 wt. % filler, in relation to the polymer polyol,
   c) a low molecular weight chain extender having an average functionality of from 1.8 to 2.1 and a number average molecular weight of from 18 g/mol to 750 g/mol and/or a cross-linking agent having an average functionality of from 2.2 to 8 and a number average molecular weight of from 18 g/mol to 750 g/mol,
   in the presence of
   d) optionally, a catalyst,
   e) optionally, a blowing agent and
   f) optionally, an additive,
   with
   g) at least one polyisocyanate comprising
      g1) an organic polyisocyanate,
      g2) a modified polyisocyanate,
      g3) an isocyanate-terminated prepolymer based on g1) and/or g2) and a polyol x),
      wherein the polyol x) comprises
         x1) a polyester polyol,
         x2) a polyetherester polyol or
         x3) a mixture of x1) and x2),
      g4) and a mixture of g1), g2) and/or g3).

5. An elastomeric molding having a density of from 180 to 1200 kg/m$^3$ produced from the polyurethane elastomer of claim 1.

6. A shoe sole having a density of from 180 to 1200 kg/m$^3$ produced from the polyurethane elastomer of claim 1.

7. A process for the production of an elastomeric molded article comprising molding the polyurethane elastomer of claim 1.

8. A process for the production of a shoe sole comprising molding the polyurethane elastomer of claim 1 into the form of a shoe sole.

* * * * *